(12) United States Patent
Hoffmann et al.

(10) Patent No.: US 11,550,810 B2
(45) Date of Patent: Jan. 10, 2023

(54) SYSTEMS AND METHOD FOR GENERATING A STRUCTURED REPORT FROM UNSTRUCTURED DATA

(71) Applicant: Thomson Reuters Enterprise Centre GmbH, Zug (CH)

(72) Inventors: Hella-Franziska Hoffmann, London (GB); Johannes Schleith, London (GB)

(73) Assignee: Thomson Reuters Enterprise Centre GmbH, Zug (CH)

( * ) Notice: Subject to any disclaimer, the term of this patent is extended or adjusted under 35 U.S.C. 154(b) by 196 days.

(21) Appl. No.: 16/269,325

(22) Filed: Feb. 6, 2019

(65) Prior Publication Data

US 2019/0243841 A1 Aug. 8, 2019

Related U.S. Application Data

(60) Provisional application No. 62/626,829, filed on Feb. 6, 2018.

(51) Int. Cl.
*G06F 16/25* (2019.01)
*G06F 16/34* (2019.01)
(Continued)

(52) U.S. Cl.
CPC ........... *G06F 16/254* (2019.01); *G06F 16/30* (2019.01); *G06F 16/345* (2019.01); *G06F 40/174* (2020.01); *G06F 40/186* (2020.01)

(58) Field of Classification Search
None
See application file for complete search history.

(56) References Cited

U.S. PATENT DOCUMENTS

| 2004/0163043 A1* | 8/2004 | Baudin | G06F 16/313 707/E17.058 |
| 2009/0119268 A1* | 5/2009 | Bandaru | G06F 16/951 707/999.003 |

(Continued)

FOREIGN PATENT DOCUMENTS

| EP | 3005148 A1 | 4/2016 |
| EP | 3724790 A1 | 10/2020 |

OTHER PUBLICATIONS

International Search Report and Written Opinion issued for PCT Application No. PCT/IB2019/050962, dated May 24, 2019, 13 pages.

(Continued)

*Primary Examiner* — Son T Hoang
(74) *Attorney, Agent, or Firm* — Norton Rose Fulbright US LLP

(57) ABSTRACT

Methods and systems for providing computer-assisted guided review of unstructured data to generate a structured data output based on customizable template rules. In embodiments, an unstructured file is received, and a predefined template is selected. The predefined template includes a plurality of fields, each field corresponding to a field of the structured report. The predefined template also defines extraction rules for each field of the predefined template, and the extraction rules define parameters for identifying unstructured data relevant to the associated field. The extraction rules are applied to the unstructured file to identify data relevant to the field associated with the corresponding extraction rule, and the data identified as relevant is confirmed. Confirming the relevant data includes determining to refine the relevant data based on a condition, and modifying the extraction rule associated with the field to refine the relevant data.

20 Claims, 13 Drawing Sheets

(51) Int. Cl.
*G06F 16/30* (2019.01)
*G06F 40/174* (2020.01)
*G06F 40/186* (2020.01)

(56) References Cited

U.S. PATENT DOCUMENTS

| | | | | |
|---|---|---|---|---|
| 2009/0216746 | A1* | 8/2009 | Aubin | G06F 16/254 |
| 2011/0093481 | A1* | 4/2011 | Hussam | G06F 16/20 |
| | | | | 707/756 |
| 2011/0295854 | A1* | 12/2011 | Chiticariu | G06F 16/313 |
| | | | | 707/737 |
| 2015/0039651 | A1* | 2/2015 | Kinsely | G06F 16/254 |
| | | | | 707/779 |
| 2015/0309990 | A1* | 10/2015 | Allen | G06F 16/245 |
| 2018/0024982 | A1* | 1/2018 | Fan | G06F 16/40 |
| 2018/0267947 | A1* | 9/2018 | Miller | G06F 16/2477 |

OTHER PUBLICATIONS

Patent Cooperation Treaty, International Search Report and Written Opinion issued for PCT Application No. PCT/IB2022/053218, dated Jul. 5, 2022, 10 pages.

* cited by examiner

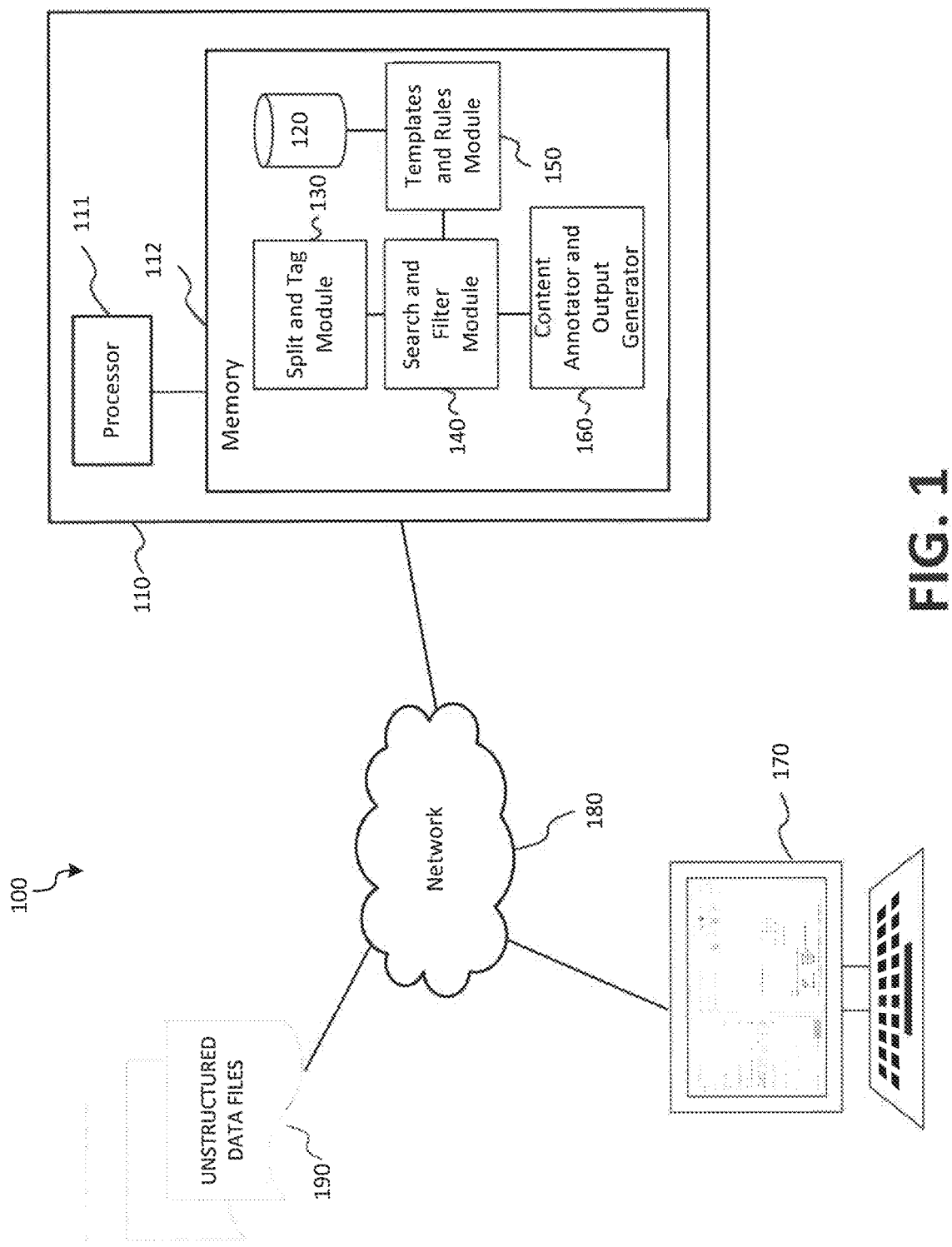

GENERAL

| | | | |
|---|---|---|---|
| Case Reference: | PI-LSCC-1116-JST1 | Status: | Investigating Liability |
| Disease Type: | NIHL | Date Response Due: | 20.02.2017 |
| Handler: | Sara K. Smith | Supervisor: | |
| Comments: | | | |

PARTICULARS  251

| | | | |
|---|---|---|---|
| Claimant's Name: | John Smith | Insured: | Ledshire City Council |
| Claimant's Date of Birth: | 05.10.1955 | Insurer: | Keito Insurance |
| Claimant's Address: | 1 Chapel Hill, Heswall, LEDSHIRE, LS1 1AA | | |
| 252 | | | |
| Claimant's Solicitor: | Taylor and Jones Solicitors | | |

COVERAGE AND POLICY STATUS

| | |
|---|---|
| Exposure Period: | 1980 to 1989 |
| Policy Cover: | MMI - 01/12/1979 to 31/03/1989 |
| Status: | ☐ Confirmed    ☐ Confirmed subject to proof of employment    ☐ Under investigation |
| Co-Insurers: | N/A |
| Co-Defendants: | Claim sent to I & J Construction represented by Williams and Brown Solicitors. Possibly other noisy employers. Requested further details from claimant. |
| Special Handling Instructions | ☐ Yes    ☑ No |
| Apportionment agreed by all Parties? | ☐ Yes    ☑ No |
| Case Status | ☑ Handling    ☐ Coordinating    ☐ Follow |

LIABILITY  253

| | |
|---|---|
| Liability Status | ☑ Under Investigation  ☐ No admissions  ☐ Admitted  ☐ Denied |
| Liability Comments *eg nature of the job Claimant undertook/documentary evidence* | Documents and Surveys/Company Information: To be confirmed<br><br>Claimant's Job/Role/Employment:<br>• Claimant was employed by defendant as a concrete labourer at the Lake Woods Depot in Heswall<br>• Alleged exposure to concrete mixers, dozers, generators and hammer drills.<br>• Alleged exposure from nearby equipment.<br>• Working hours: 40 hours a week, 8 hours per day from Monday to Friday. Machinery operated at least 4h hours a day.<br>• Never provided with ear protection during his employment.<br>• Never given any noise awareness training.<br>• no noisy hobbies<br><br>Handlers Assessment/ Liability Conclusion:<br>Requested further information regarding the work environment and time using each tool etc.<br><br>☑ Likely exposed    ☐ Unlikely exposed    ☐ Borderline |

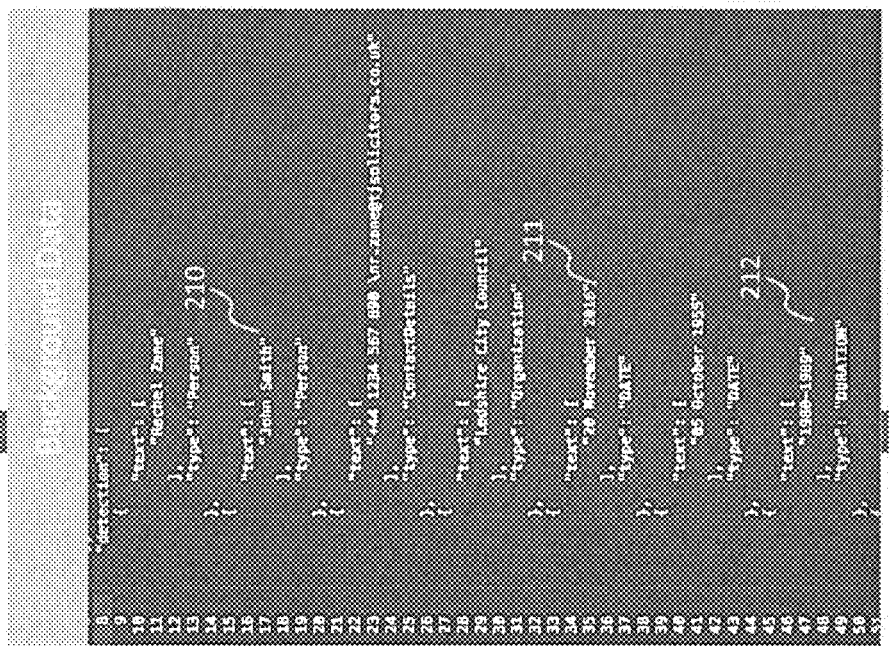

Reuters & Thomson Barristers

Contact: Rachel Zane

T: +44 1234 567 890
E: r.zane@tjsolicitors.co.uk

Our ref: JSLC1116/PI
Your ref: Not known

20 November 2016

201

Dear Sir

John Smith vs Ledshire City Council and others

Our client: John Smith
Address: 1 Chapel Hill, Heswall, LEDSHIRE, LS1 1AA
DOB: 05 October 1955
NI: QQ 123456 C
Exposure period: 1980-1989

We are instructed by the above-named client to claim damages in connection with noise induced hearing loss and/or tinnitus as a result of their employment with your insured. We are writing this letter in accordance with the Pre Action Protocol for Disease and Illness Claims.

Please note that as much information as possible is provided, whether herein or in the enclosures. We trust you will respond to the allegations in a timely manner and note that according to the protocol you are obliged to acknowledge receipt of this correspondence within 21 days and provide a detailed response within 3 months. Please inform relevant insurers of the claim, if there are multiple entities who provided insurance cover, the identity of all insurers should be disclosed to us within 30 days of the date of acknowledgement of this letter.

SYSTEMS AND METHOD FOR GENERATING A STRUCTURED REPORT FROM UNSTRUCTURED DATA

CROSS-REFERENCE TO RELATED APPLICATION

The present application claims priority to U.S. Provisional Application No. 62/626,829, filed Feb. 6, 2018 and entitled, "CLAIMS ASSESSMENT," the disclosure of which is incorporated by reference herein in its entirety.

TECHNICAL FIELD

The present subject matter is directed generally to data extraction, and more particularly to unstructured data analysis to generate a structured data output based on customizable template rules.

BACKGROUND

Given the large amounts of data related to any facet of life, it is no wonder that any manual review of even relatively small amounts of documents can prove to be time consuming, tedious, and expensive. This is the case for any manual review process implemented with respect to, e.g., claim processing. In these cases, claim processing can involve large amounts of documents that need to be reviewed to find, identify, and extract data that is relevant to a particular case, such as client and involved parties information, and factual evidence. Complicating the process is the fact that most documents that need to be reviewed are not structured documents, in the sense that the documents include natural language expressions rather than structured language fields. Claim processors thus must parse through the large amounts of volumes looking for relevant information, which may lead to missed information, and, in the best of cases, may be a very expensive process.

Some solutions have been proposed to address the challenges with manual document review, most involving computer-assisted review. In one particular solution, a system provides functionality to recognize and extract all specific items, such as entities, dates, etc. However, this solution offers no semantic context to the extracted data. As such, a user must still parse through the extracted items, without context, to identify desired data. Thus, this solution offers marginal improvements.

Another solution that has been proposed involves more sophisticated data extraction methods, such as using business rules or machine learning algorithms. In some cases, the extraction algorithms need to be trained by the user before they can be applied. However, in these cases, the rules and algorithms may be hardcoded and non-transparent. These extraction algorithms are essentially a black box that does not provide transparency into the extraction process or allow a user to make dynamic modifications. Thus, these solutions are inflexible.

SUMMARY

The present application relates to systems and methods for providing computer-assisted guided review of unstructured data to generate a structured data output based on customizable template rules. In one particular embodiment, a method of generating a structured report from unstructured data may be provided. The method may include receiving at least one input file containing the unstructured data, and selecting a predefined template. The predefined template may include a plurality of fields, each field corresponding to a field of the structured report. The predefined template may define at least one extraction rule for one or more fields in the plurality of fields of the predefined template. The at least one extraction rule may define parameters for identifying data in the unstructured data of the at least one input file that is relevant to the corresponding field of the predefined template. The method may also include applying the at least one extraction rule to the at least one input file to identify the data that is relevant to the field associated with the corresponding at least one extraction rule. The method may further include confirming the data identified as relevant. Confirming the data identified as relevant may include determining to refine the data identified as relevant to the field associated with the corresponding at least one extraction rule based on at least one condition of the data identified as relevant, and modifying, in response to the determining, the at least one extraction rule associated with the field to refine the data identified as relevant to the field.

In another embodiment, a system for generating a structured report from unstructured data may be provided. The system may include at least one unstructured document source, and a server. The server may, be configured to receive at least one unstructured document and a user input to select a predefined template. The predefined template may include a plurality of fields, each field corresponding to a field of the structured report. The predefined template may define at least one extraction rule for one or more fields in the plurality of fields of the predefined template, and the at least one extraction rule may define parameters for identifying data in the unstructured data of the at least one unstructured document that is relevant to the corresponding field of the predefined template. The server may also be configured to apply the at least one extraction rule to the at least one unstructured document to identify the data that is relevant to the field associated with the corresponding at least one extraction rule. The server may be further configured to confirm the data identified as relevant. Confirming data identified as relevant may include determining to refine the data identified as relevant to the field associated with the corresponding at least one extraction rule based on at least one condition of the data identified as relevant, and modifying, in response to the determining, the at least one extraction rule associated with the field to refine the data identified as relevant to the field.

In yet another embodiment, a computer-based tool for generating a structured report from unstructured data may be provided. The computer-based tool may include non-transitory computer readable media having stored thereon computer code which, when executed by a processor, causes a computing device to perform operations that may include selecting a predefined template. The predefined template may include a plurality of fields, each field corresponding to a field of the structured report. The predefined template may define at least one extraction rule for one or more fields in the plurality of fields of the predefined template, and the at least one extraction rule may define parameters for identifying data in at least one unstructured document that is relevant to the corresponding field of the predefined template. The operations may also include displaying data identified as relevant to the one or more fields of the plurality of fields. The data identified as relevant to the one or more fields may be identified based on an application of the at least one extraction rule associated with a corresponding field to the at least one unstructured document. The operations may further include confirming the data identified as relevant. Confirming the data identified as relevant may include determining to refine the data identified as relevant to the field associated with the corresponding at least one extraction rule based on at least one condition of the data identified as relevant, and causing modification, in response to the determining, of the at least one extraction rule associated with the field to refine the data identified as relevant to the field.

The foregoing broadly outlines the various aspects and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 1 shows a block diagram of an exemplary system configured to perform operations in accordance with embodiments of the present disclosure;

Figure 2C:
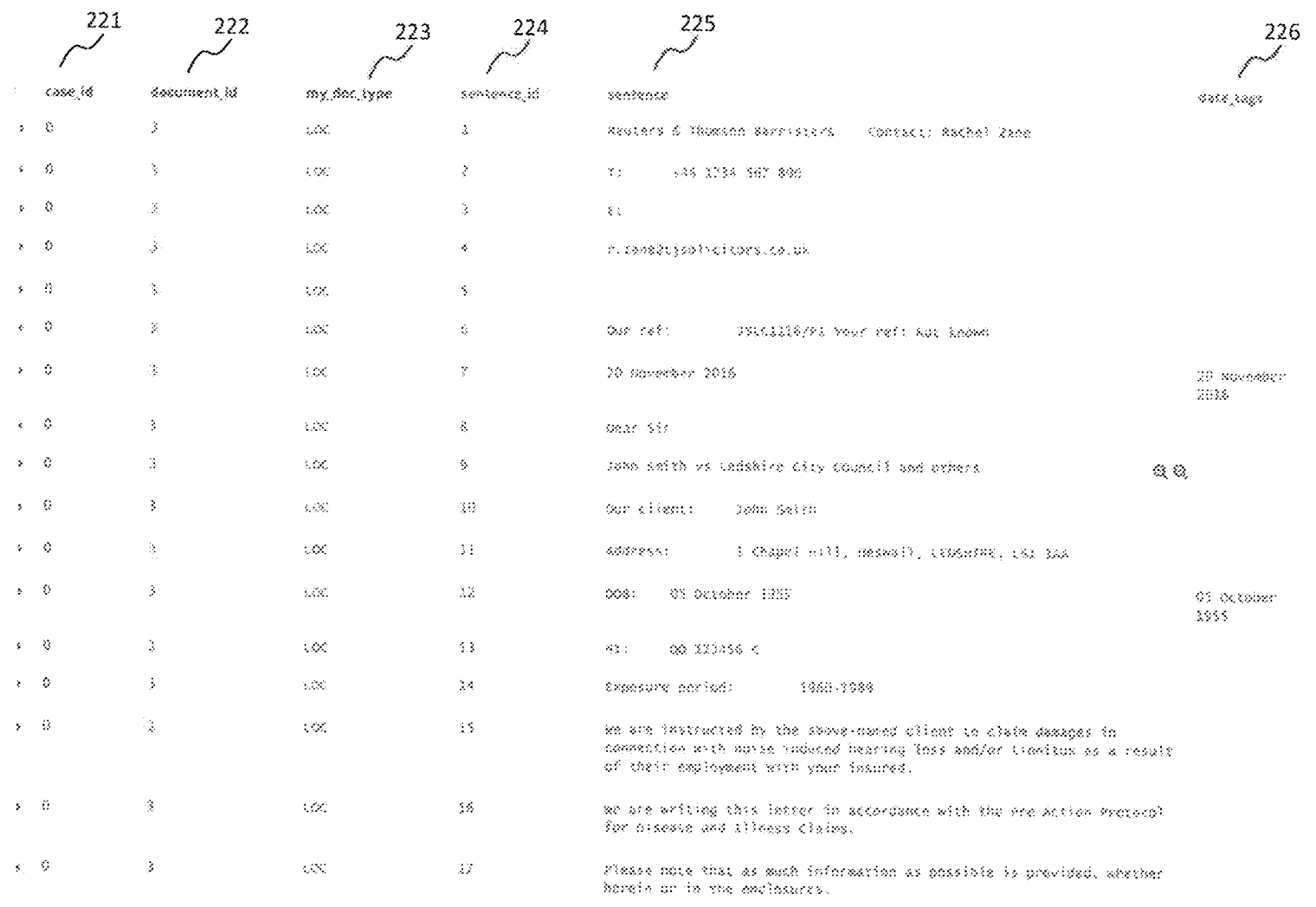

FIG. 2A shows an example view of a structured report in accordance with embodiments of the present disclosure;

FIG. 2B shows an example view of a subsentence item identification and tagging in accordance with embodiments of the present disclosure;

FIG. 2C shows an example of a sentence level index in accordance with embodiments of the present disclosure;

FIG. 2E shows an example of an extraction of relevant statements within the unstructured input files in accordance with embodiments of the present disclosure;

FIG. 2F shows an example view of a graphical user interface (GUI) configured in accordance with embodiments of the present disclosure;

DETAILED DESCRIPTION

Figure 2D:
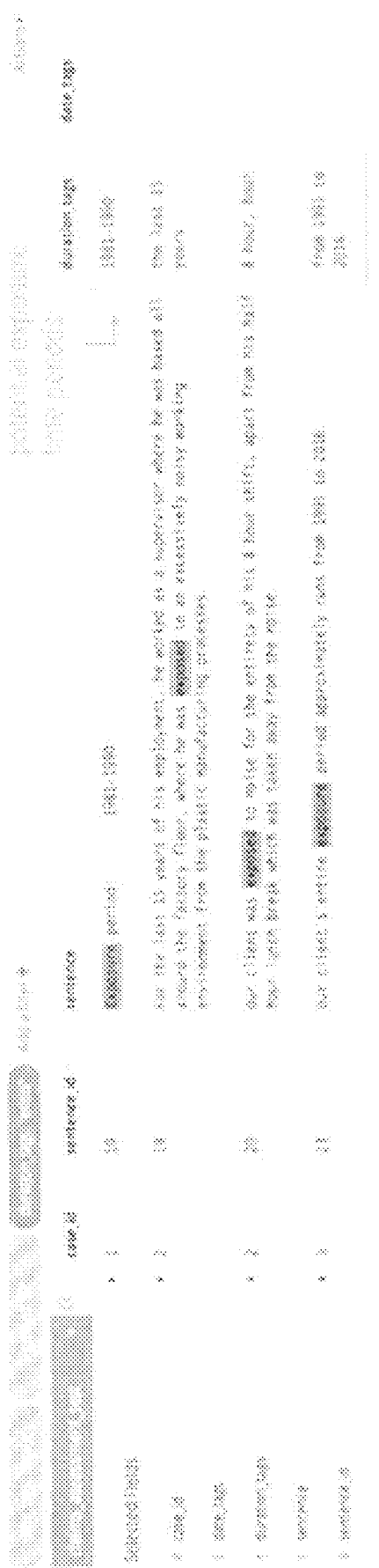
FIG. 2D shows an example of a search for subsentence items within a context of a keyword filter in accordance with embodiments of the present disclosure.

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail, it should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

FIG. 1 is a block diagram of an exemplary system 100 configured with capabilities and functionality for providing computer-assisted guided review of unstructured data to generate a structured data output based on customizable template rules in accordance with embodiments of the present disclosure. As shown in FIG. 1, system 100 includes server 110 and at least one user terminal 170 communicatively coupled with server 110. These components, and their individual components, may cooperatively operate to provide functionality in accordance with the discussion herein. For example, in operation according to embodiments, unstructured data files 190 may be provided as input to server 110. The various components of server 110 may cooperatively operate to process the content of the unstructured data files 190 based on predefined templates, to apply content extraction algorithms to unstructured data files 190 in order to identify and extract unstructured information relevant to the various sections of the predefined templates based on extraction rules associated with the various sections of the predefined templates. In embodiments, the extraction rules of the predefined templates may be dynamically modifiable by users during operations. The extracted information may be used to generate a structured output report.

It is noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

Unstructured data files 190 may comprise at least one document including unstructured data. Unstructured data may refer to information expressed in natural language, may include information structured differently than the desired output report (e.g., as indicated by a predefined template), and may include information structured differently in different files of unstructured data files 190. Unstructured data files 190 may include files having various formats (e.g., pdf, txt, doc, etc.). In one particular example, content of data files of unstructured data files 190 may include information related to claims, such as personal injury claims, insurance claims, etc. Information related to particular aspects of a claim may be spread over a particular document, or documents, in the unstructured data files 190. For example, information related to a period of employment of a particular person may be included in different sections of a document, or documents. Similarly, a date of birth of a person may be in some section of some document, or documents. From this, it will be appreciated that identifying and extracting such information from unstructured data files 190 manually may be difficult, long, and tedious. Even using existing automated systems, which may extract all dates, a user may have to go through all dates to manually filter the correct desired date. As will be further appreciated, aspects of the present disclosure provide a mechanism to alleviate and obviate the deficiencies of existing systems.

User terminal 170 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 170 may be configured to provide a GUI structured to facilitate input and output operations in accordance with aspects of the present disclosure. Input output operations may include operations for selecting data files from unstructured data files 190 for input to server 110, selecting a predefined template to apply to the selected files to identify relevant content based on the extraction rules in the selected predefined template, validating the identified relevant content, modifying the extraction rules to refine the extraction process, and selecting relevant content to include in the output report. These functions are described in more detail below. In some embodiments, users may create the predefined templates. Creating the predefined templates may include creating and/or specifying extraction rules to be included in the predefined templates. Aspects for creation of predefined templates and extraction rules are described in more detail below.

It is noted that, in some embodiments, system 100 may be configured with different levels of users. For example, users may be assigned an admin level or a user level. Admin level may be higher than user level, and may include more and/or higher privileges than user level. For example, an admin may be allowed to make configuration changes and to specify an outlay of the GUI. In addition, the admin may be allowed to create predefined templates, while a user may be allowed to select predefined templates but not create them. In embodiments, an admin may also be allowed to create extraction rules and assign them to particular sections of the predefined template, while a user may be allowed to modify the extraction rules but not reassign them from the particular sections to which the extraction rules are assigned.

Server 110, user terminal 170, and unstructured data files 190 may be communicatively coupled via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between server 110, user terminal 170, and unstructured data files 190.

Server 110 may be configured to receive as an input at least one unstructured data file in unstructured data files 190, to provide extraction of relevant content from the data files based on a predefined template and dynamically modifiable extraction rules, to facilitate modification of the dynamically modifiable extraction rules by a user, and to provide a structured output report based on the extracted relevant content. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of server 110 as single and separate blocks, each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

As shown in FIG. 1, server 110 includes processor 111, memory 112, database 120, split and tag module 130, search and filter module 140, templates and rules module 150, and content annotator and output generator 160. Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, as noted above, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Memory 112 may also be configured to facilitate storage operations. For example, memory 112 may comprise database 120 for storing user profile information (e.g., privilege levels, preference data, statistical data, etc.), predefined templates, extraction rules, etc., which system 100 may use to provide the features discussed herein. Database 120 is illustrated as integrated into memory 112, but may be provided as a separate storage module. Additionally or alternatively, database 120 may be a single database, or may be a distributed database implemented over a plurality of database modules.

Templates and rules module 150 may be configured to facilitate creation and configuration of predefined templates and extraction rules to be defined and included in the predefined templates. In some embodiments, a user with administrative privileges may use terminal 170 to create and configure, using the GUI, a predefined template using the functionalities of templates and rules module 150. A predefined template may include various fields and sections that correspond to field and sections of a structured output report. In that sense, a predefined template may be viewed as defining the structured output report. Templates and rules module 150 may also include functionality to allow the user to specify, for the various fields and sections, the information required to be included in those fields and sections of the template (and consequently in the structured output report). For example, a user may specify a name of "date of claim" for a particular field, and may specify that for the "date of claim" field, a date should be entered. Additionally, the user may also specify extraction rules that may be applied to the unstructured input files to obtain the "date of claim" date. These extraction rules will be discussed in more detail below. The same may be done for each field and section of the predefined template. The results may be, after operations in accordance with aspects of the present disclosure, a template in which each field includes relevant information extracted from the unstructured input files based on a corresponding extraction rule for the various fields of the template. It is noted that different templates may be created for different use cases and for different structured output reports. The extracted information may be then be used to generate a corresponding structured output report. FIG. 2A illustrates an example of a structured output report 250.

A structured output report may be designed to provide a quick reference view of information contained in one or more documents for an end user reviewing a work file. As shown in FIG. 2A, structured output report 250 may include various fields and sections. For example, structured output report 250 may include field 251 to indicate the claimant's name and field 252 to indicate the claimant's date of birth. In this case, a predefined template (not shown) corresponding to structured output report 250 may be created to similarly include fields to indicate the claimant's name and date of birth. For the claimant's name field in the predefined template, a user may specify that a "named entity" should be included. For the claimant's date of birth field in the predefined template, a user may specify that a "date" should be included. Furthermore, the user may create, select, and/or define extraction rules for obtaining the relevant information from the unstructured input files. For example, for the claimant's date of birth field in the predefined template, a user may specify an extraction rule that searches for a date and inputs into the date of birth field. It is again noted that extraction rules are discussed in more detail below.

Structured output report 250 may also include section 253 for including liability comments. In this case, a user may specify that this section may include statements. An extraction rule may be specified for section 253 that facilitates collection of any statement within the unstructured input files related to liability. As will be further explained below, this may include identifying and tagging sentences within the unstructured input files, and applying filters that identify sentences relevant to liability, such as by using keywords, semantic expressions, entities within the context of a keyword, etc.

Templates and rules module 150 may also be configured to facilitate modification of the extraction rules by a user during operations. In aspects, a user may edit the extraction rules to further refine the extraction of relevant content from the unstructured input files. For example, a predefined template field may require a claimant's date of birth. An extraction rule associated with this predefined template field may search for dates and extract all of the dates as potential matches to the date of birth. In this case, during operation, a user may modify the extraction rule to include a filter that extracts a date that is proximate to a keyword "DOB." As a results, the potential matches are further refined based on the modification, which results in more accurate results being provided to the user. This functionality of templates and rules module 150 will be discussed in more detail below. In some aspects, template and rules module 150 may also include functionality to automatically refine the extraction rules based on a user selection. For example, where an extraction rule returns multiple matches, a user selecting one of the matches may cause templates and rules module 150 to refine the extraction rules to account for the user selection.

With reference back to FIG. 1, split and tag module 130 may be configured to receive unstructured data and/or data files from unstructured data files 190 as input, to split the unstructured input file into sentences, to identify subsentence items, and to index the unstructured input file, the sentences, and the subsentence items in the unstructured data file. In aspects, the functionality of split and tag module 130 to split the unstructured input file may implemented using a text conversion approach. In a text conversion approach, the unstructured input file may be processed to obtain a raw text version of the unstructured input file. The text conversion may be accomplished using various commonly available tools, and/or customized tools. For example, the PDFMiner python package may be used to obtain a raw text version of the unstructured input file. The raw text version of the unstructured input file may then be processed to split the raw text into sentences. In aspects, natural language processing (NLP) algorithms may be applied to the raw text to split the raw text into sentences. The NLP algorithms may obtained using various commonly available tools, and/or customized tools. For example, the NLTK python package may be used to split the raw text into sentences. The results of this text conversion approach may be a textual representation of the unstructured input file split into individual sentences.

In another aspect, a Hypertext Markup Language (HTML) conversion approach may be used. In an HTML approach, the unstructured input file may be processed to obtain an HTML version of the unstructured input file. The HTML conversion may be accomplished using various commonly available tools, and/or customized tools. For example, the PDFMiner python package may be used to obtain an HTML version of the unstructured input file. The HTML version of the file respects line breaks, and also includes HTML tags that specify different sections of the unstructured input file (e.g., header, body, title, paragraphs, etc.). The HTML tags of the HTML version of the unstructured input file may be used to break up the unstructured input file into chunks, where each chunk may correspond to different sections of the unstructured input file. It will be appreciated that the chunks may be more manageable than the entire unstructured input file. As such, each chunk may then be processed to split the chunk into sentences. For example, NLP algorithms may be applied to the chunks to split the chunks into sentences. The NLP algorithms may obtained using various commonly available tools, and/or customized tools. For example, the NLTK python package may be used to split the chunks into sentences. The results of this approach is a textual representation of each section of the unstructured input file split into individual sentences.

It is noted that the text conversion approach works well for floating text, such as the body of an email. In some cases, the text conversion approach may extract subsentence levels, such as content from columns, headers, lists, and other structural content in a random order or as one big sentence. However, in this situation, the HTML conversion approach may work well, as it involves using structural components captured in HTML to break up content into chunks and allows extracting subsentence level items, such as contact information and bullet point items, etc., to be done more easily. As such, embodiments of the present disclosure may use a combined approach to split the unstructured input files into sentences, in which a combination of the text conversion and HTML conversion approaches may be used. It is also noted that the resulting individual sentences may or may not be semantically coherent. For example, a particular sentence may be a sentence such as "Please note that as much information as possible is provided, whether herein or in the enclosures." As will be appreciated, this sentence is semantically coherent. Other particular sentences, however, may not be semantically coherent. For example, a sentence another sentence resulting from the splitting operations may be "someone@email.com," which may not be semantically coherent by itself. This is because the splitting operations of split and tag module 130 split the unstructured input file into the sentences, while further operations of system 100, as discussed below, identify sentences which are statements, and those which are actually subsentence elements (e.g., dates, entities, times, values, special designations, identifications, email addresses, telephone numbers, etc.).

In some embodiments, prior to the splitting of the unstructured input files, the files may be processed to digitize the content within the files. For example, the unstructured input files in unstructured data files 190 may be scanned files, image files, and or other type of non-searchable files. In this case, the unstructured input files may be OCR'd (optical character recognition). In embodiments, the unstructured input files are further processed to refine white space and character recognition, to handle tables, tick boxes, line breaks, columns, and other structural elements, and to identify and integrate special symbols and images. This further functionality may be implemented using machine learning algorithms.

Split and tag module 130 may be configured to, subsequent to splitting the unstructured input files into sentences, identify and tag subsentence items. In aspects, identifying and tagging subsentence items may be accomplished using NLP algorithms. Subsentence items may include items that are not necessarily a sentence, and may include items such as dates, entities, times, values, special designations, identifications, email addresses, telephone numbers, etc. In some embodiments, identifying and tagging subsentence items may include performing named entity recognition and date tagging. Named entity recognition may include applying NLP algorithms to identify entities (e.g., organizations, facilities, groups, companies, countries, governments, persons, places, products, etc.). Named entity recognition may be accomplished using various commonly available tools, and/or customized tools. For example, OpenCalais may be used to identify and tag subsentence items as entities. In some embodiments, named entity recognition may also provide a positive identification of the entity. Date tagging may include identifying, normalizing, and extracting dates, times, and/or periods from the unstructured input file. Date tagging may be accomplished using various commonly available tools, and/or customized tools. For example, Stanford NLP's SUTime library may be used to identify, normalize, and extract dates, times, and/or periods from the unstructured input file. Additionally or alternatively, for example, the datefinder python package may be used to perform date tagging operations.

FIG. 2B shows an example of subsentence item identification and tagging. As can be seen, unstructured input file 201 contains various entities, dates, and time periods. Structure 202 shows the identification and tagging of these various subsentence items. For example, element 210, "John Smith," has been identified and tagged as a "Person." Similarly, element 211, "20 Nov. 2016," has been identified and tagged as a "DATE." Element 212, "1981-1989," has been identified and tagged as a "DURATION."

It will be appreciated that although the functionality of split and tag module 130 allows system 100 to split the unstructured input files into sentences and to identify and tag subsentence items, there is yet no relation between the different subsentence items, the sentences, and the unstructured input file. To provide such relations, split and tag module 130 provides fin indexing functionality. Indexing allows for providing a relationship between the subsentence items, the sentences, and the unstructured input file. In some implementations, indexing includes three search indices: a document level index, a sentence level index, and a subsentence index. In some embodiments, the subsentence index may be a document level subsentence index.

The document level index may include an ID field, a document type field, and a document content field. The ID field may be include the case number of the case associated with the document, and document number, and may be generated when the document is selected for input, or when the document is uploaded for OCR. The document type field may specify the type of document (e.g., letter of claim, tax schedule, letter of defense to claimant, etc.). The document content field may include the unstructured input file content as raw text.

The sentence level index may include a case ID field, a document ID field, a document type field, a sentence ID field, a sentence text field, a raw sentence level subsentence tag field, and a normalized sentence level subsentence tag field. For example, with reference to FIG. 2C, sentence level index 220 may include case ID 221 of the ease associated with the document, and document ID 222. The case ID and document ID may be generated when the document is selected for input, or when the document is uploaded for OCR. Sentence level index 220 may also include document type 223 specifying the type of document. Sentence ID 224 indicates the ID of a particular sentence. In some embodiments, the ID of a sentence may correspond to the order of appearance of the sentence within the document. Sentence text field 225 may include the text of the corresponding sentence in raw text. As will be noted, sentence text field 225 may contain semantically coherent sentences, or subsentence items. In a case where the sentence text field includes a subsentence item, a sentence level subsentence tag field may be included. For example, date tags field 226 may include a date tag for the particular sentence. In some embodiments, the date tag may be raw or may be normalized. In other embodiments, a tag field may be included for other subsentence items. For example, a raw sentence level entity tag (not shown) may be provided to include an entity tag for a subsentence item found in the corresponding sentence. Additionally, or alternatively, a normalized sentence level entity tag (not shown) may be provided to include an entity tag for a subsentence item found in the corresponding sentence.

As noted above, the subsentence index may be a document level subsentence index. In this case, the substance index may include a case ID field, a document ID field, a normalized subsentence item text field, a raw subsentence item text field, a context strings field, and an offset field. The case ID may include the ID of the case associated with the document, and the document ID field may include the ID of the document where a particular subsentence item is found. The case ID and document ID may be generated when the document is selected for input, or when the document is uploaded for OCR. The normalized subsentence item text field may include the normalized subsentence item text. For example, a particular subsentence item may be identified and tagged as an entity. In this case, the normalized subsentence item text field may include the normalized name of the entity. The raw subsentence item text field may include the raw subsentence item text as it appears in the unstructured input file. For example, where a particular subsentence item may be identified and tagged as an entity, the raw subsentence item text field may include the name of the entity as it appears in the unstructured input file. The context strings field may include strings within which the entity appears, or that are proximate to the subsentence item within the document. In aspects, the proximity may be configurable and may be specified as a number of words, letters, spaces, or characters from the subsentence item. The offset field may include a value indicating the location of the subsentence item within the unstructured input file relative to the start of the unstructured. Input file, or the location of the subsentence item within a sentence relative to the start of the sentence.

With reference back to FIG. 1, search and filter module 140 may be configured to apply extraction rules to the split and tagged unstructured input file in order to identify and extract relevant content for generating a structured output report based on a predefined template. In some aspects, the extraction rules may leverage the splitting, tagging, and indexing functionality of split and tag module 130 to provide smart filtering and searching capabilities. For example, the split and tagged unstructured input file may include indexed sentence content, such as sentence text, IDs, and subsentence tags. This may allow functionality to perform smart filtering and searching using extraction rules.

In aspects, the extraction rules of embodiments may include various rules for identifying information within an unstructured document relevant to a particular section of a predefined template. This may be accomplished using various search and filtering functions provided by search and filter module 140. In some cases, the extraction rules may include a combination of any of the following search and filtering functions. It will be appreciated that the following search and filtering functions are intended to be exemplary, and not limiting. Those of skill in the art will appreciate that other search and filtering functions may also be used to implement extraction rules. Additionally, it is noted that extraction rules may be included in predefined templates and may associated with particular fields. In embodiments, extraction rules may be defined in a predefined template in a delimit form. For example, the default extraction rules may include a combination of any of the search and filtering functions discussed below. During operation, a user may select a template having default extraction rules, which may be applied to the unstructured input files. As will be discussed in more detail below, a user may determine to modify the default extraction rule. For example, the user may determine to modify the default with rules in the predefined template to include any combination of the search and filtering functions discussed below, to include searches, filters, keywords, etc., in order to refine the results obtained for the associated field.

In an embodiment, the search and filtering functions may include text keyword filters that may be implemented to search for a particular keyword in a sentence or an entity. In this case, the sentence and subsentence indices may be leveraged to identify the indexed data of any sentence and/or entity in which the keyword appears. For example, the content may be filtered to identify all sentences containing the phrase "hearing protection." The result according to aspects of the present disclosure would be not only identification of sentences containing the keyword, but also the sentence IDs, the case IDs, the document IDs, and any subsentence tag associate with that sentence.

Another search and filtering function may include an order of occurrence filter. In this case, the order of occurrence of a particular item (e.g., a sentence, or an entity) may be obtained by application of this filter. The order of occurrence may indicate the order of appearance of the item, either within an unstructured input file or within a sentence. For example, for a particular date, the particular date may be the first date mentioned in an unstructured input file. In this case, the order of occurrence may be found to be 1. In a particular application, a user may determine that the first date that appears within a document of type "letter of claim" may be the date of the claim. In this case, application of the order of occurrence filter may yield a result that can be leveraged to identify the particular date as the date of the claim. For example, an extraction rule associated with a date of claim section of a predefined template may specify that for documents of type "letter of claim," a date with an occurrence of 1 may be determined to be the date of the claim.

Still another search and filtering function may include a search for relative quantities. For example, this search function may compare values and return the smaller or larger value in the unstructured input file or sentence. In some aspects, the object returned may be relative to a static value. For example, a filter may be defined to extract any date that falls before a given date. In some implementations, a filter may be defined to return items that appear before another given item. For example, a filter may return all dates that appear within a document before the last date that appears within the document.

Yet another search and filtering function may include a search for subsentence items within a context of a keyword. For example, a filter may be defined to extract periods of time that are lexically proximate to a keyword, such as "exposure." In this case, the filter may return durations found within a sentence proximate to the term "exposed," or semantically similar terms. FIG. 2D illustrates this example. In this case, a user may apply this filter in an extraction rule for identifying potential exposure time periods, which may then be included in a predefined template.

Search and filter module 140 may also be configured to provide functionality, to facilitate extraction of relevant statements within the unstructured input files. In some cases, a template may specify that for a particular section, statements relevant to a particular fact, or facts, are to be included. For example, in one particular case, an important factor for determining liability of an employer may be to determine whether the employer provided protective equipment to the claimant. In this case, a predefined template for generating a structured report for the case may include a section for including information regarding the provision of hearing protection. As will be appreciated, there are various ways of expressing information related to this fact. For example, this fact could be expressed in the text as "Our client was never provided with hearing protection," or "Your company failed to provide adequate protective gear in the form of 'hearing protection.'" Search and filter module 140 provides functionality to account for such textual differences when identifying and extracting factual information.

Figure 2E:
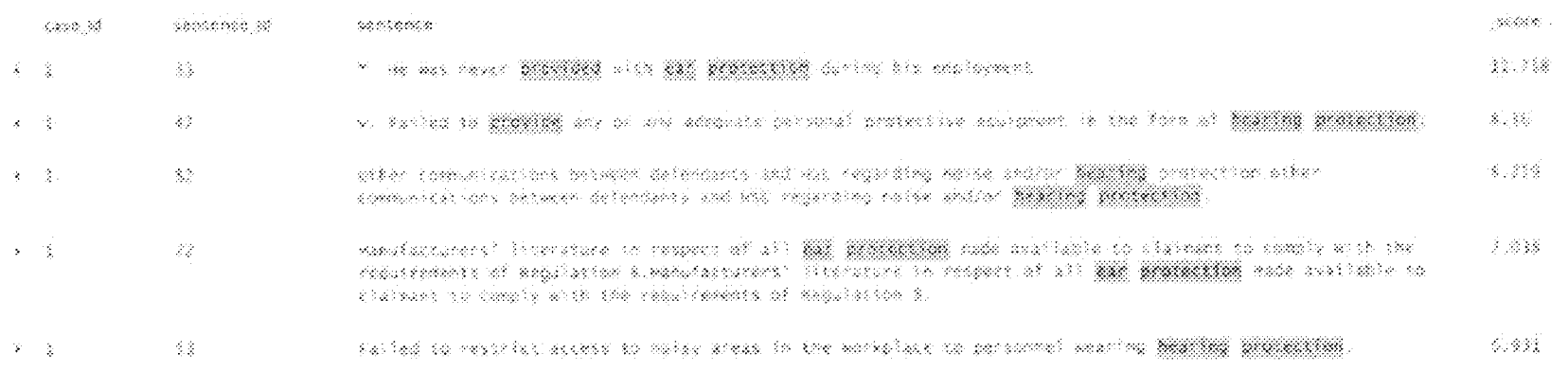

In aspects, one approach to facilitate extraction of relevant statements within the unstructured input files may include a Boolean keyword search. In this approach, statements including a keyword related to the factual information desired may be extracted. As such, this approach may filter the unstructured text to include only the results that match the query (e.g., any sentence containing "hearing OR protection"). In embodiments, the results may be ranked based on word overlap using, e.g., term frequency-inverse document frequency (TF-IDF) algorithms or similar statistical analysis. FIG. 2E illustrates this example.

Another approach to facilitate extraction of relevant statements within the unstructured input files may include a semantic similarity search. For example, a semantic textual similarly algorithm may be applied to the unstructured input files to identify sentences that are semantically similar. In this case, an extraction rule may be defined to include a semantic textual search using an input sentence. For example, following in the above case illustrated in FIG. 2E, an input sentence for the semantic textual search may be used describing a fact such as "the employer did not provide the client with hearing protection." The semantic textual search may then identify and extract all sentences within the unstructured document including semantically similar sentences.

Figure 2F:
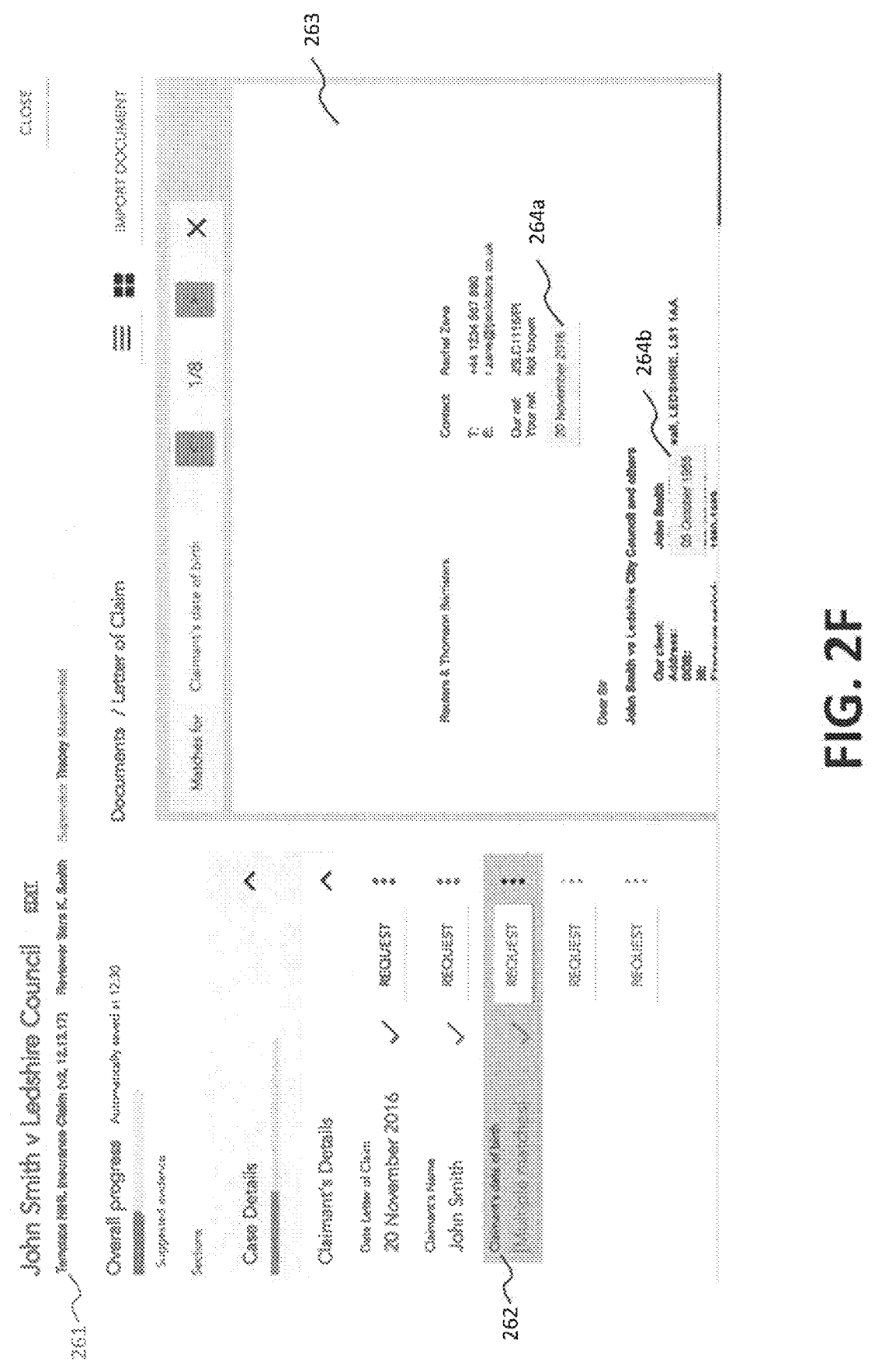

Content annotator and output generator 160 may be configured to provide functionality for annotating the content extracted from the unstructured input files based on the extraction rules to facilitate collection of relevant content to be included in the structured output report based on the predefined template. In aspects, the annotations to the extracted content may include highlighting, or otherwise marking, the relevant content within a graphical representation of the unstructured input file in a GUI. For example, as shown in FIG. 2F, a predefined template 261 may specify a field requiring a field 262 for including the "claimant's date of birth." As discussed above, extraction rules associated with field 262 may also be defined by template 261. As shown in FIG. 2F, the extraction rules for field 262 returned multiple potential matches. Section 263 may include a representation of the unstructured input file content where the potential matches for field 262 may have been found. The functionality of content annotator and output generator 160 may operate to mark the potential matches to the extraction rules by, e.g., highlighting potential dates 264a and 264b that may be the claimant's date of birth. This functionality of content annotator and output generator 160 is discussed in further detail below with respect to operational aspects of the present disclosure.

Content annotator and output generator 160 may also be configured to generate the structured output report based on the extracted relevant content associated with each of the predefined template fields and section. In aspects, the structured output report may be generated by populating the structured output report with the relevant content extracted for each corresponding field and section of the associated predefined template. In some embodiments, content annotator and output generator 160 may be configured to generate, structure, and populate the GUI provided by user terminal 170.

Figure 3:
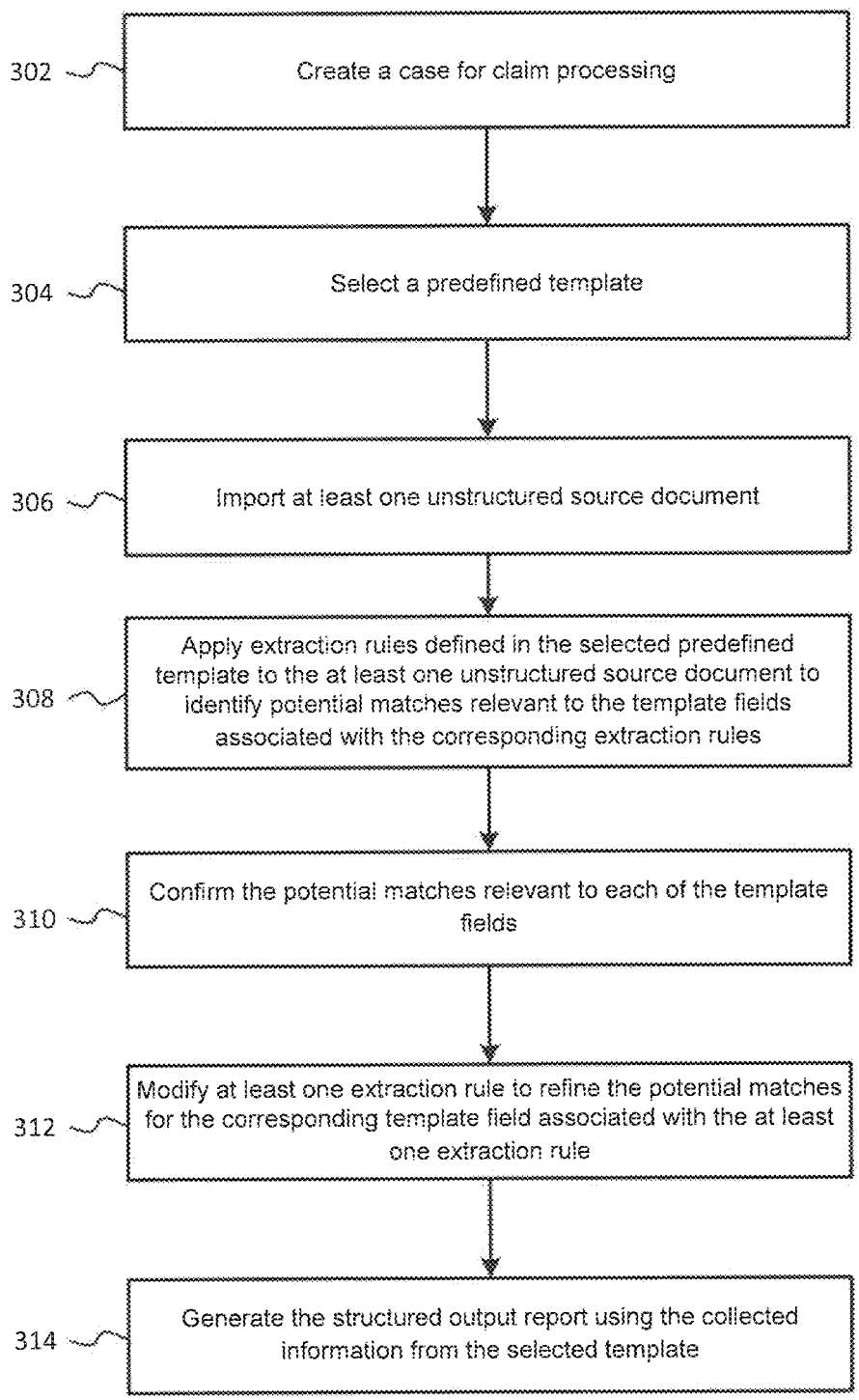
FIG. 3 shows a functional block diagram illustrating an example flow executed to implement aspects of the present disclosure.

FIG. 3 shows a high level flow diagram of operation of a system configured in accordance with aspects of the present disclosure for providing computer-assisted guided review of unstructured data to generate a structured data output based on customizable template rules in accordance with embodiments of the present disclosure. For example, the functions illustrated in the example blocks shown in FIG. 3 may be performed by system 100 of FIG. 1 according to embodiments herein.

In general terms, embodiments of the present disclosure provide functionality for search capabilities that go beyond a basic keyword search. Aspects of the present disclosure allow for the combination and storage of not only keyword searches but also more advanced semantic searches, and for associating the searches to specific portions of a predefined template. As such, the information extraction and review process by an end-user is significantly improved. In addition, the various aspects providing for content annotation allow a user to more easily collect and link individual statements to a predefined template section (e.g., evidence for liability, evidence for limitation, etc.). This enables a user to rapidly build up a large set of annotated structured data, based on unstructured source documents. Furthermore, various aspects of the present disclosure provide the ability for a user to dynamically customize and review extraction rules, which creates a level of transparency that is lacking in existing systems. This also allows the user to describe and create extraction mechanisms for more complex concepts, such as "date of birth," "defendant's name," etc. Therefore, Applicant notes that the solution described herein is superior, and thus, provides an advantage over prior art systems.

One application of the techniques and systems disclosed herein may be in a claims processing environment. As noted above, claim processing involves analysis of large amounts of documents and data, which are usually unstructured. Typically, the documents are analyzed and reviewed manually by a user. The user reviews the document and parses the content to identify information relevant to a particular use. For example, a report may require certain data, which the user must then find and extract from the unstructured documents. In another example, there may be questions that may be answered by sections of the unstructured document, but the user must find, identify, and extract those sections from the unstructured document. Even in systems that use extraction algorithms, the extraction algorithms are usually a black box that does not provide transparency into the extraction process or allows a user to make dynamic modifications. Aspects of the present disclosure provide an advantageous system that allows a user to not only easily identify potential relevant content, but to also dynamically modify the extraction rules for a more flexible, responsive, and robust approach. It is again noted that the discussion that follows, which is directed to claim processing, is merely an example embodiment and should not be construed as limiting in any way.

At block 302, a user creates a case for a claim processing. For example, a user may determine to review an insurance claim, or a personal injury claim, and may create a new case for the claim. In some aspects, the case review may include generating a structured output report (e.g., structured output report 250 of FIG. 2A), which may include various information to be included in various fields and sections of the structured output report. The information to be included in the structured output report may be obtained from various unstructured source documents.

Figure 4A:
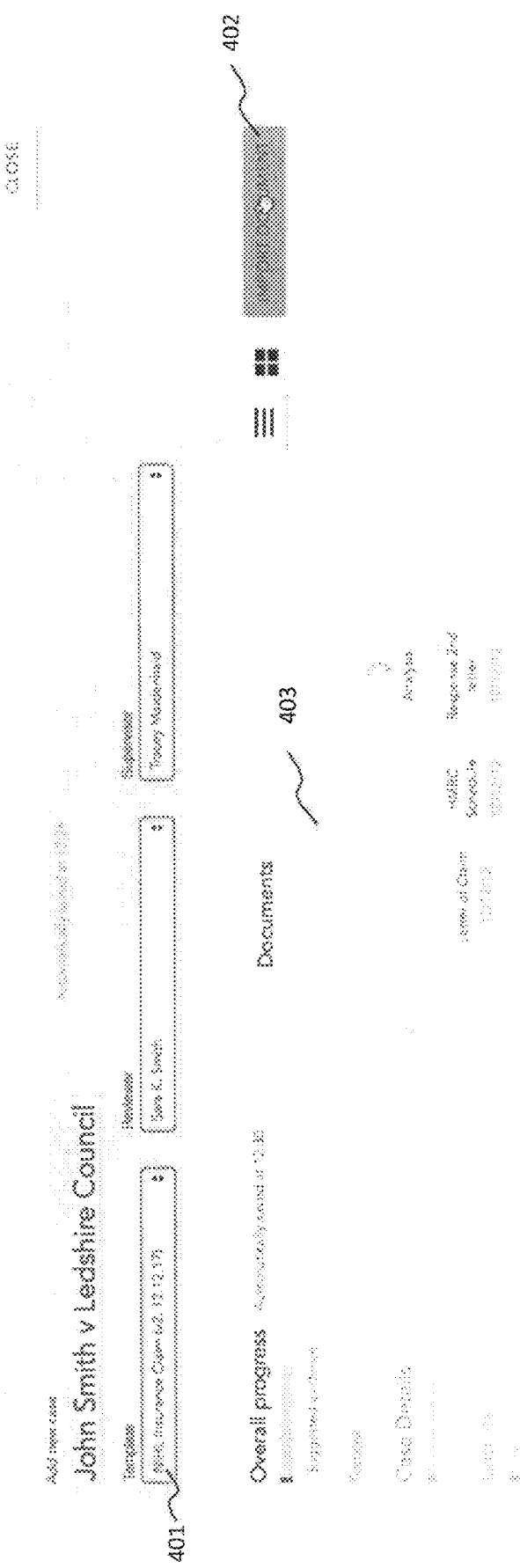
FIG. 4A shows another example view of a GUI configured in accordance with embodiments of the present disclosure.

With the case created, the user selects a template to use at block 304. For example, with reference to FIG. 4A, a user may select template 401 from a plurality of predefined templates. In aspects, the predefined template may be a template stored in database 120 of FIG. 1. The template may be a previously created template, e.g., by a software provider, a user with administrative privileges, a supervisor, etc. In aspects, the previously created template may be created using functionality of templates and rules module 150. The template selected by the user may specify the structure, and fields and sections for which information is required in order to generate the structured output report. The template may also include, for each field and section, the type of information required, and at least one extraction rule for extracting the relevant content from the unstructured source documents. In a sense, the template may provide the system information on what type of content is required for each field, and how to find the content in the unstructured source documents.

Referring back to FIG. 3, at block 306, the user may import at least one unstructured source document. For example, a user may activate GUI element 402 to import unstructured source documents 403. In aspects, the unstructured source documents may include any one or more of a letter of claim, a tax schedule, a response letter, entails, etc. The unstructured source documents may be unstructured, and/or may have a non-searchable format. For example, the unstructured source documents may be scans of the corresponding document. In this ease, the unstructured source document may be OCR'd or otherwise processed to digitize the non-searchable content and convert it into searchable content.

Figure 4B:
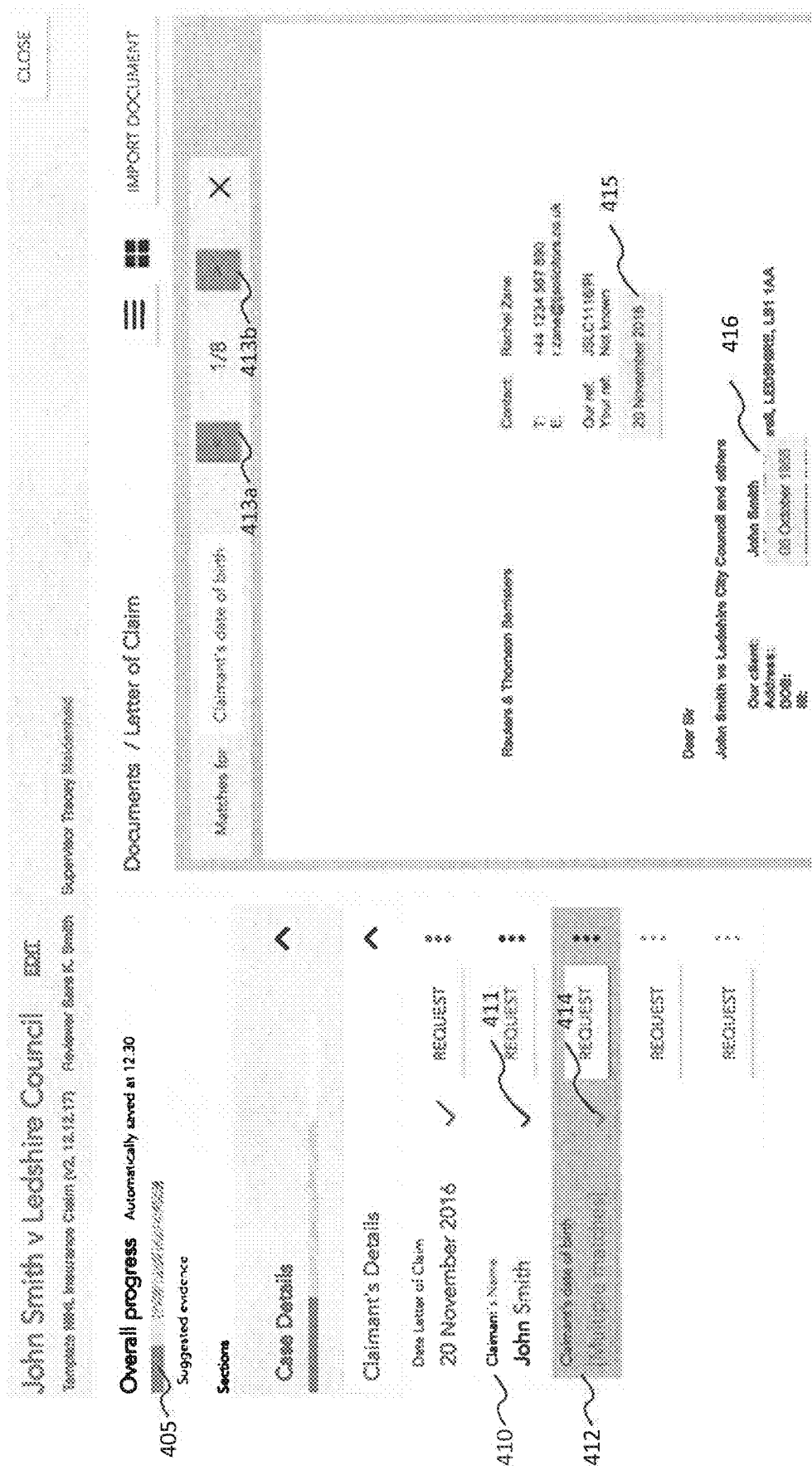
FIG. 4B shows another example view of a GUI configured in accordance with embodiments of the present disclosure.

At block 308, the extraction rules defined in the selected template are applied to the content of the unstructured source documents in order to identify and extract the content relevant to the template fields associated with the corresponding extraction rules. As described above, prior to the application of the extraction rules, the content of the unstructured source documents may be split and tagged in accordance with the functionality of split and tag module 130 of FIG. 1, in order to identify, tag, and index individual sentences and subsentence items within unstructured source documents, in aspects, the application of the extraction rules results in potential matches for the various template fields. For example, as shown in FIG. 4B, application of the extraction rules defined in the selected template results in potential matches for the various template fields.

At optional block 310, the user may confirm the potential matches for each of the template fields. For example, for field 410 in FIG. 4B, which is configured to include the claimant's name, a potential match of "John Smith" has been identified. The user may confirm the match by activating element 411, in which case the system assigns the match as confirmed. With respect to field 412, which is configured to include the claimant's date of birth, the application of the extraction rules associated with this field has yielded multiple potential matches. In this case, the user may toggle through the multiple potential matches to identify the correct match. For example, the user may activate element 413a or 413b to toggle through the multiple potential matches and then activate element 414 to confirm the correct match for field 412. In embodiments, the potential matches are highlighted in the graphical representation of the unstructured source document in order to facilitate rapid identification of the potential match. For example, multiple potential matches 415 and 416 are highlighted as potential matches for field 412. In embodiments, as the user toggles through the multiple potential matches for field 412, the corresponding potential matches are highlighted in the unstructured source document, such as that when the user toggles to potential match 415, only potential match 415 is highlighted in the unstructured source document.

Figure 4C:
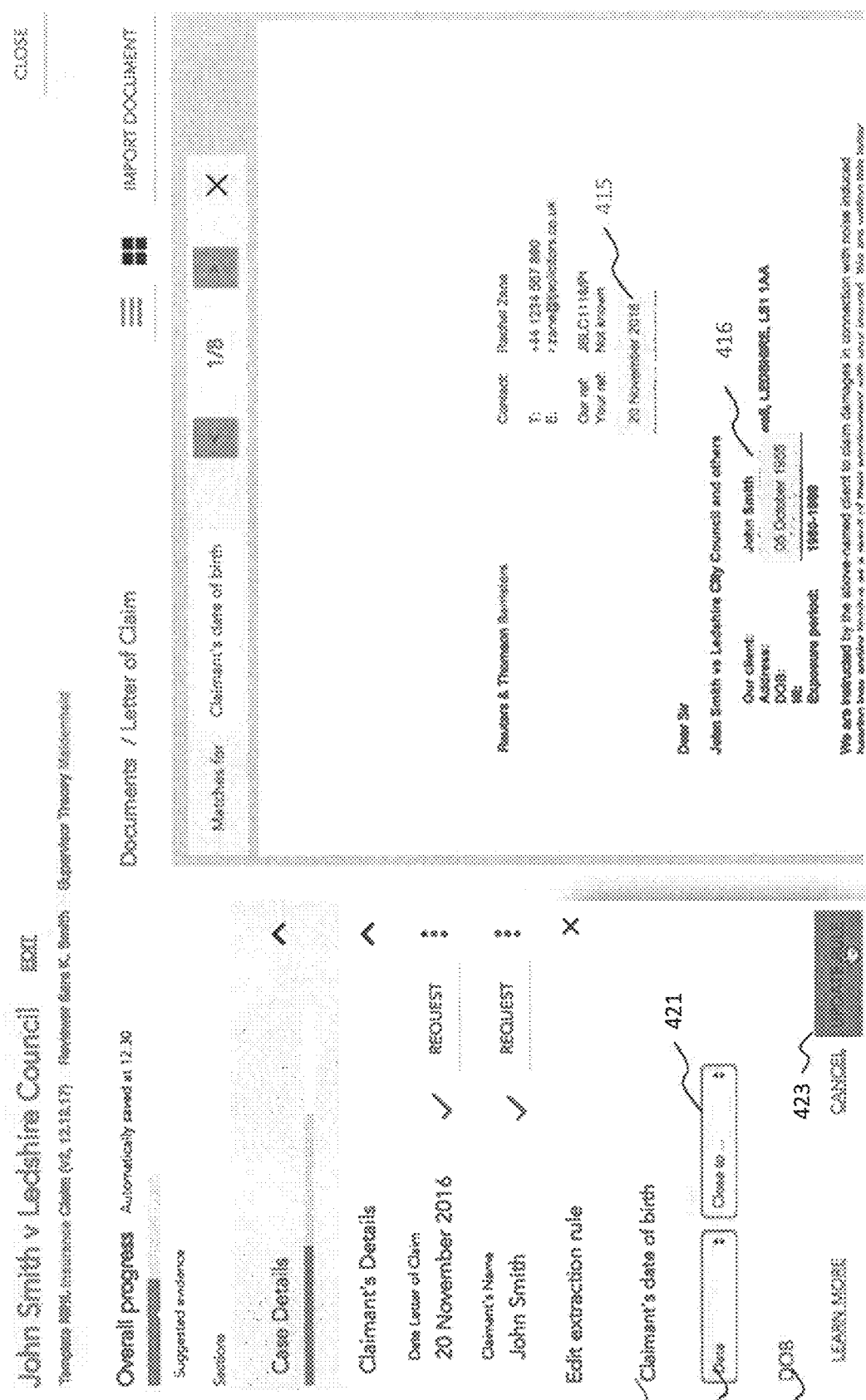
FIG. 4C shows another example view of a GUI configured in accordance with embodiments of the present disclosure.
Figure 4D:
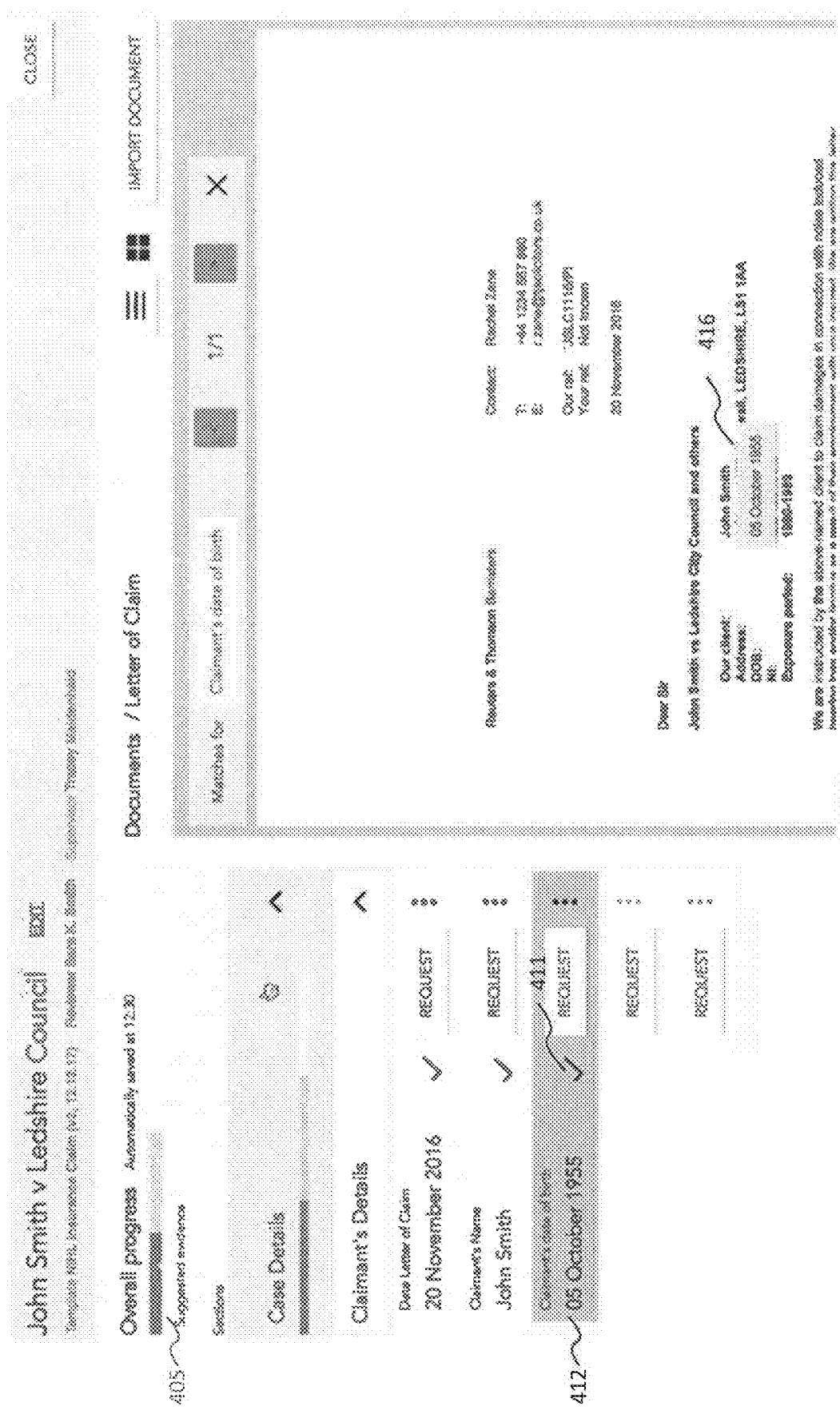
FIG. 4D shows another example view of a GUI configured in accordance with embodiments of the present disclosure.
Figure 4E:
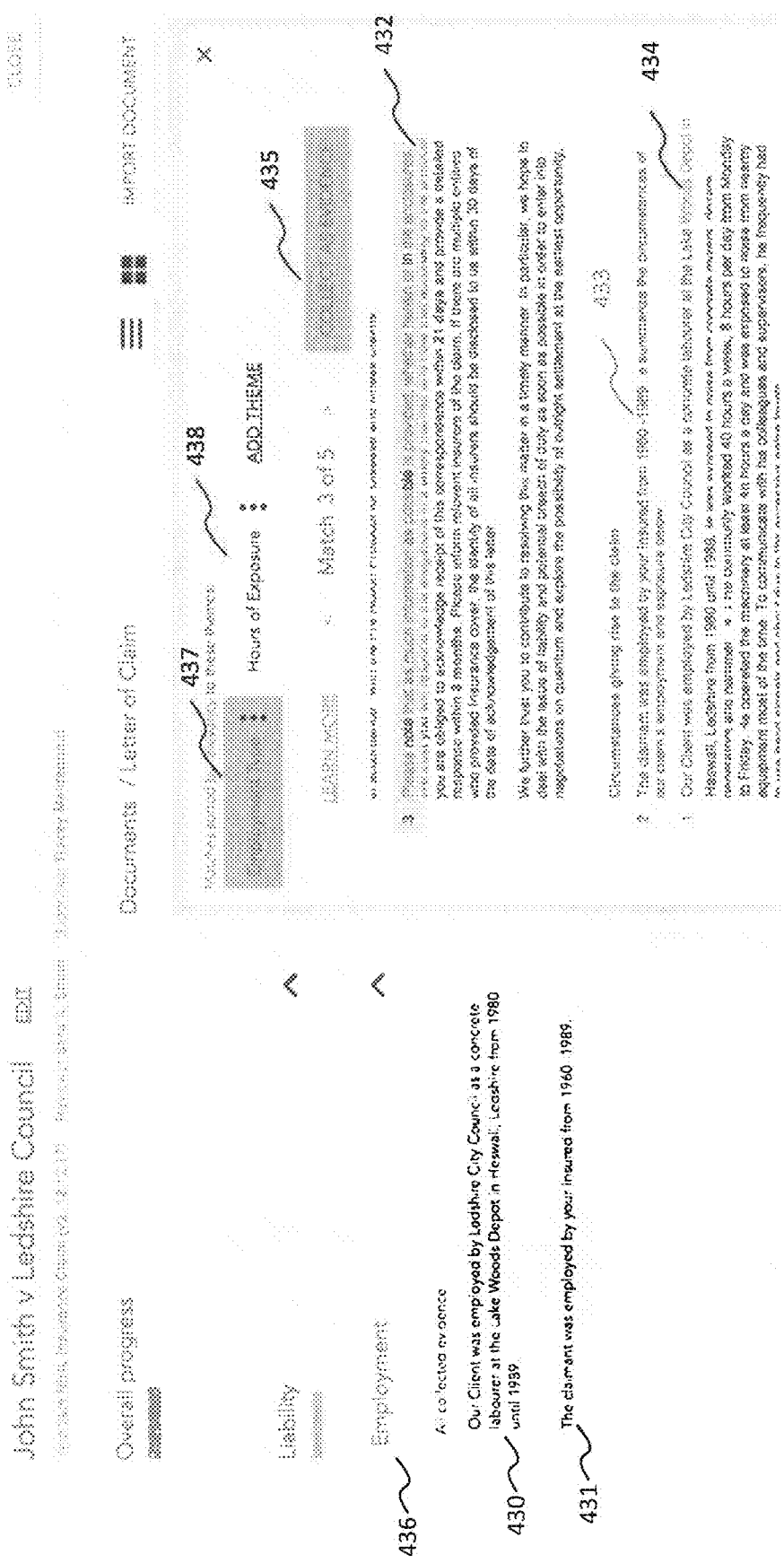
FIG. 4E shows another example view of a GUI configured in accordance with embodiments of the present disclosure.

In embodiments, the selected template may define a section or sections for collection of evidence. In this case, the section may require statements, which may include sentences related to a particular type of evidence (e.g., liability, employment, etc.). In addition, themes may be specified for each type of evidence. For example, as shown in FIG. 4E, the selected template may, specify a section 436 for collection of employment evidence. The collection of employment evidence may include themes 437, employment type evidence, and theme 438, hours of exposure type evidence. In aspects, the themes may include extraction rules that specify how the relevant data may be identified and presented to the user. For example, for employment type evidence, theme 437 may specify that sentences including keywords such as "employed" and "as," or semantically similar terms, may be identified as employment type evidence. In addition, the extraction rules for employment type evidence may specify that semantically similar statements to the statements "claimant was employed as a construction worker," or "claimant was employed from 1981 to 1992" may be identified as employment type evidence. In this case, statements 432, 433, and 434 have been identified as potential matches for employment type evidence. The user may toggle through the various identified statements, and, upon deciding that a particular statement should be collected as evidence, may activate element 435 to collect the statement. In that case, the statement may be included in the evidence collected, such as collected statements 430 and 431, which correspond to potential matches 434 and 433, respectively. In some cases, a blacklist may be included as part of the extraction rules for a particular theme, which may include blacklist statements. In this case, statements in the unstructured documents that are semantically similar to the blacklist statements may not be included as the corresponding theme.

With reference back to FIG. 3, at block 312, the user may modify at least one extraction rule to refine the potential matches for the corresponding template field associated with the at least one extraction rule. For example, for field 412 of FIG. 4B, multiple potential matches 415 and 416 have been identified by the extraction rule associated with field 412. This modification may be shown by a GUI generated and configured in accordance with the functionality of content annotator and output generator 160 of FIG. 1. As shown in FIG. 4C, a user may modify the extraction rules associated with field 412 to further refine it. For example, the extraction rule may specify a type "date" 420 fix field 412. The user may add filter 421, which defines a lexical proximity filter that extracts dates within proximity to a keyword. In this case, the user may specify keyword 422 as "DOB." Based on this, the updated extraction rules may extract any date that is close to the keyword "DOB." In some aspects, the proximity may be defined in terms of words, such as within 10 or less words of the keyword, or may be specified in terms of characters. As the user activates the updated extraction rule by activating element 423, the updated extraction rule is applied to the identified content, which is refined, as seen in FIG. 4D. As shown in FIG. 4D, potential match 425 is no longer provided and instead, only potential match 416, which is in close lexical proximity to the keyword "DOB"

is presented to the user as a potential match to field 412. The user may then confirm potential match 416 by activating element 411.

It is appreciated that some or all such fields of a template may be refillable and the type of refinement may be dependent on source documents and a user preferences. Hence, the above rule modification is provided by way of example, and one of ordinary skill in the art would understand that various modifications may be possible when provided with the present system.

In embodiments, a progress bar 405 may be presented to the user to provide a visual indication of the fraction of information required that has been extracted. In aspects, a different visual indicator may be used to represent information that has been confirmed than to represent information that has not been confirmed. Therefore, as more potential matches are confirmed, the indicator in progress bar 405 increases.

Referring back to FIG. 3, at block 314, the structured output report is generated using the collected information from the selected template. In aspects, the fields and sections of the selected template correspond to fields and sections of the structured output report. As such, the fields and sections of the structured output report may be populated using the collected information for each of the fields and sections of the selected template. The collected information for each of the fields and sections of the selected template is structured representation of the information from the unstructured source documents. The generation of the structured output report may be accomplished using functionality in accordance with the functionality of content annotator and output generator 160 of FIG. 1. In some aspects, the structured output report may be a case plan and/or cases management information.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1 and 3 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a cloud storage facility, or any other form of storage medium known in the art. An exemplary storage medium is coupled to the processor such that the processor can read information from, and write information to, the storage medium, in the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of generating a structured report from unstructured data, comprising:
   receiving at least one input file containing the unstructured data;
   selecting a predefined template, wherein the predefined template includes a plurality of fields, each field defining a field of the structured report, and wherein the predefined template defines at least one extraction rule for one or more fields in the plurality of fields of the predefined template, the at least one extraction rule defining parameters for identifying data in the unstructured data of the at least one input file that is relevant to the corresponding field of the predefined template;
   applying the at least one extraction rule to the at least one input file to identify the data that is relevant to the field associated with the corresponding at least one extraction rule; and
   confirming the data identified as relevant, wherein the confirming includes:
      determining to refine the data identified as relevant to the field associated with the corresponding at least one extraction rule based on at least one condition of the data identified as relevant;
      modifying, in response to the determining, the at least one extraction rule associated with the field to refine the data identified as relevant to the field;
      applying the modified at least one extraction rule to the at least one input file to identify refined data that is relevant to the field, the refined data including a subset of the data identified as relevant by the at least one extraction rule; and
      including the refined data in the field associated with the modified at least one extraction rule.

2. The method of claim 1, wherein the predefined template is predefined prior to the selecting, and wherein predefining the predefined template includes:
   defining each field in the plurality of fields of the predefined template; and
   specifying, for at least one defined field in the plurality of fields:
      a type of data to be included in the field; and
      the at least one extraction rule for identifying data that is relevant to the field, the identified data being of the type.

3. The method of claim 2, wherein the at least one extraction rule includes at least one filter and at least one keyword, wherein the at least one filter extracts the relevant data from the unstructured data based on the at least one keyword.

4. The method of claim 3, wherein the at least one filter is one of: a text keyword filter, an order of occurrence filter, a search for relative quantities filter, and a search for subsentence items within a context of a keyword filter.

5. The method of claim 2, wherein the type of data to be included in the field includes one of: a sentence and at least one subsentence item.

6. The method of claim 5, wherein the sentence includes a semantically coherent textual item, and the at least one sub sentence item includes at least one of: a date, an entity, a time, a value, a special character, an identification, an email address, and a telephone number.

7. The method of claim 1, further comprising, for each field of the plurality of fields, collecting the data confirmed as relevant to each field to be included in the corresponding field of the predefined template such that each field in the plurality of fields includes relevant data.

8. The method of claim 7, further comprising populating fields of the structured report using the relevant data for each corresponding field of the plurality of fields.

9. The method of claim 1, wherein the at least one condition of the data identified as relevant includes at least one of: the relevant data including multiple potential matches for the field, the relevant data including no matches for the field, and the relevant data consisting of an incorrect match for the field.

10. The method of claim 1, further comprising:
    splitting, prior to the applying the at least one extraction rule, the at least one input file into individual sentences;
    identifying subsentence items within the at least one input file; and
    tagging the identified subsentence items based on the type of the subsentence items.

11. The method of claim 10, further comprising indexing each of the at least one input file, the individual sentences, and the identified subsentence items.

12. The method of claim 11, wherein the applying the at least one extraction rule is based on the indexed at least one input file, the individual sentences, and the identified subsentence items.

13. A system for generating a structured report from unstructured data, comprising:
    at least one unstructured document source;
    a server configured to:
       receive at least one unstructured document;
       receive a user input to select a predefined template, wherein the predefined template includes a plurality of fields, each field defining a field of the structured report, and wherein the predefined template defines at least one extraction rule for one or more fields in the plurality of fields of the predefined template, the at least one extraction rule defining parameters for identifying data in the unstructured data of the at least one unstructured document that is relevant to the corresponding field of the predefined template;
       apply the at least one extraction rule to the at least one unstructured document to identify the data that is relevant to the field associated with the corresponding at least one extraction rule; and
       confirm the data identified as relevant, wherein confirming the data identified as relevant includes:
          determining to refine the data identified as relevant to the field associated with the corresponding at least one extraction rule based on at least one condition of the data identified as relevant;
          modifying, in response to the determining, the at least one extraction rule associated with the field to refine the data identified as relevant to the field;
          applying the modified at least one extraction rule to the at least one input file to identify refined data that is relevant to the field, the refined data including a subset of the data identified as relevant by the at least one extraction rule; and
          including the refined data in the field associated with the modified at least one extraction rule.

14. The system of claim 13, wherein the predefined template is predefined prior to the selection of the predefined template, and wherein the server is further configured to accept further user inputs to:
- define each field in the plurality of fields of the predefined template; and
- specify, for at least one defined field in the plurality of fields:
  - a type of data to be included in the field; and
  - the at least one extraction rule for identifying data that is relevant to the field, the identified data being of the type.

15. The system of claim 14, wherein the at least one extraction rule includes at least one filter and at least one keyword, wherein the at least one filter extracts the relevant data from the unstructured data based on the at least one keyword.

16. The system of claim 15, wherein the at least one filter is one of: a text keyword filter, an order of occurrence filter, a search for relative quantities filter, and a search for subsentence items within a context of a keyword filter.

17. The system of claim 13, wherein the at least one condition of the data identified as relevant includes at least one of: the relevant data including multiple potential matches for the field, the relevant data including no matches for the field, and the relevant data consisting of an incorrect match for the field.

18. The system of claim 13, wherein the server is further configured to:
- split, prior to the application of the modified at least one extraction rule, the at least one unstructured document into individual sentences;
- identify subsentence items within the at least one unstructured document; and
- tag the identified subsentence items based on the type of the subsentence items.

19. The system of claim 18, wherein the server is further configured to index each of the at least one unstructured document, the individual sentences, and the identified subsentence items.

20. A computer-based tool for generating a structured report from unstructured data, the computer-based tool including non-transitory computer readable media having stored thereon computer code which, when executed by a processor, causes a computing device to perform operations comprising:
- selecting a predefined template, wherein the predefined template includes a plurality of fields, each field defining a field of the structured report, and wherein the predefined template defines at least one extraction rule for one or more fields in the plurality of fields of the predefined template, the at least one extraction rule defining parameters for identifying data in at least one unstructured document that is relevant to the corresponding field of the predefined template;
- displaying data identified as relevant to the one or more fields of the plurality of fields, wherein the data identified as relevant to the one or more fields is identified based on an application of the at least one extraction rule associated with a corresponding field to the at least one unstructured document; and
- confirming the data identified as relevant, wherein the confirming includes:
  - determining to refine the data identified as relevant to the field associated with the corresponding at least one extraction rule based on at least one condition of the data identified as relevant;
  - causing modification, in response to the determining, of the at least one extraction rule associated with the field to refine the data identified as relevant to the field;
  - applying the modified at least one extraction rule to at least one input file to identify refined data that is relevant to the field, the refined data including a subset of the data identified as relevant by the at least one extraction rule; and
  - including the refined data in the field associated with the modified at least one extraction rule.

* * * * *

UNITED STATES PATENT AND TRADEMARK OFFICE
CERTIFICATE OF CORRECTION

PATENT NO. : 11,550,810 B2
APPLICATION NO. : 16/269325
DATED : January 10, 2023
INVENTOR(S) : Hella-Franziska Hoffmann et al.

It is certified that error appears in the above-identified patent and that said Letters Patent is hereby corrected as shown below:

In the Specification

At Column 2, Line number 24, delete "may, be" and replace with --may be--.
At Column 4, Line number 15, delete "detail, it" and replace with --detail. It--.
At Column 10, Line number 22, delete "fin" and replace with --for--.
At Column 10, Line number 46, delete "ease" and replace with --case--.
At Column 11, Line number 32, delete "unstructured. Input" and replace with --unstructured input--.
At Column 11, Line number 62, delete "delimit" and replace with --default--.
At Column 12, Line number 2, delete "default with rules" and replace with --default rules--.
At Column 12, Line number 60, delete "functionality, to" and replace with --functionality to--.
At Column 15, Line number 27, delete "entails" and replace with --emails--.
At Column 15, Line number 31, delete "ease" and replace with --case--.
At Column 15, Line number 45, delete "documents, in" and replace with --documents. In--.
At Column 16, Line number 14, delete "may, specify" and replace with --may specify--.
At Column 16, Line number 54, delete "fix" and replace with --for--.
At Column 17, Line number 5, delete "refillable" and replace with --refinable--.
At Column 18, Line number 19, delete "medium, in" and replace with --medium. In--.

Signed and Sealed this
Seventh Day of March, 2023

Katherine Kelly Vidal
*Director of the United States Patent and Trademark Office*